INVENTOR.
Harley J. Orr

United States Patent Office 3,341,675
Patented Sept. 12, 1967

3,341,675
SPACE HEATER WITH TWO THERMAL SENSORS ACTING ON A CONTROLLER ACTUATOR ALONG APPROXIMATELY THE SAME LINE
Harley J. Orr, Bedford, N.H., assignor to Sola Basic Industries, Inc., a corporation of Wisconsin
Filed Aug. 26, 1965, Ser. No. 482,867
2 Claims. (Cl. 200—138)

This invention relates to thermal controls and more particularly to controls which are employed in heating devices or the like. In the event of malfunctioning of the heating device, whether caused by electrical or mechanical failure such as air blockage, overheating will often occur, to the harm of the heating device itself or to nearby furnishings, before the malfunction is detected or corrected. While it is not uncommon for such devices to be used in conjunction with a thermal control whereby the operating temperature range of the device may be precalibrated and automatically controlled, it is desirable to provide an auxiliary control which upon overheating will act as a cutout.

Objects of the present invention are to provide thermal control means responsive both to normal operating temperatures of a heating element and to abnormal temperatures which may result from malfunctioning of the heating element, to incorporate both controls into one unit thereby providing economy of cost and space without sacrificing simplicity of operation, and to provide a thermal control unit whose versatility will lend itself to application in any type heating, cooling, or air-conditioning device, be it domestic or industrial, portable or stationary.

The present invention involves a thermal control unit having a controller which may be an electric switch. The controller is automatically actuated by two thermal sensors which are kinematically connected thereto and disposed in spaced relation so as to respond to heat at two different locations, e.g., at the controller itself and at the heating element of the device with which the control is to be used. The sensor located at the controller is preferably a bi-metallic bar which bears on the switch and is responsive to the ambient temperature whereby the operational temperature range of the device is controlled. The sensor located at the heating element itself comprises a tube extending back to the controller whereby the controller is actuated when the heating element becomes overheated.

Figure 1:
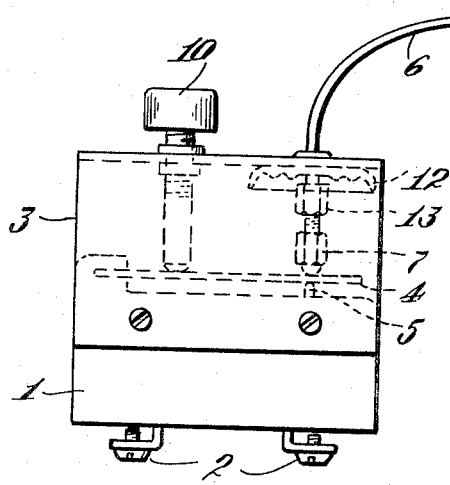
Figure 2:
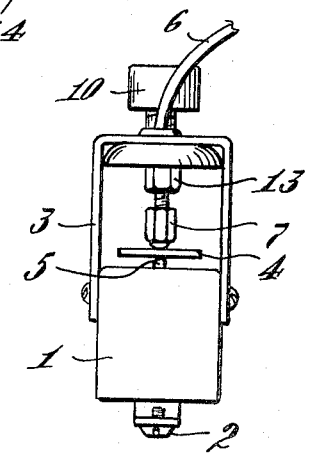
Figure 3:
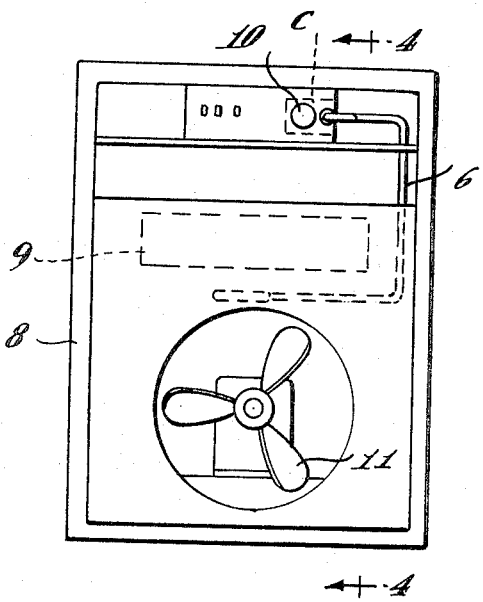
Figure 4:
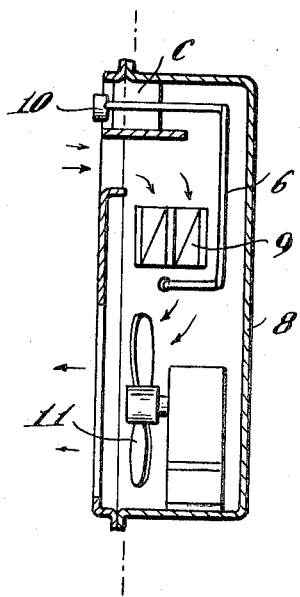

For the purpose of illustration a typical embodiment of the invention is shown in the accompanying drawing in which FIG. 1 is a front elevation of the thermal control unit;
FIG. 2 is an end view;
FIG. 3 is a front elevation of the control unit applied to a space heater; and
FIG. 4 is a section on line 4—4 of FIG. 3 showing the circulation of air.

In the particular embodiment of the invention chosen for the purpose of illustration the thermal control unit comprises the controller 1 shown to be a microswitch with terminals 2, a frame or housing 3, a bi-metal sensor 4 mounted to bear upon the button 5 of the switch, and a tube sensor 6 mounted on the frame 3 and kinematically connected to the button 5 by an actuating plunger 7. FIGS. 3 and 4 show the thermal control unit, generally indicated at C, mounted for purposes of illustration in a heating device 8. Properly mounted in said heating device, the tube sensor 6 extends from the control unit and terminates in close proximity to the heating element 9 of the device.

When the heater is in normal operation the bi-metal sensor 4 contained in the control unit C is disposed remotely from the heating element 9 so as to be fully responsive to the ambient temperature of the area to be heated. The bi-metal sensor 4 which flexes when heated to a predetermined temperature actuates the switch to shut off the heater. The sensor 4 is regulated to respond to a desired temperature by turning the adjustment knob 10.

The fan 11 in the heating device 8 draws unheated air into the device, causes it to pass over the heating element 9 and then forces the heated air out. A mechanical or electrical failure of the fan or blockage of the air path causes the heated air to remain within the heating device 8 leading to overheating of the heating element 9. The tube sensor 6 contains a fluid which expands when heated and is disposed in close proximity to said heating element so as to actuate the switch 1 upon overheating, thus serving as a thermal cutout. When the fluid expands the sensor diaphragm 12 is activated causing the plunger 7 to be depressed thus actuating the button 5 and shutting off the heating element 9. The sensor 6 is regulated by turning an adjustment nut 13. The length of the tube sensor depends upon the design of the particular heating device to be used, and the tube may terminate in a bulb 14.

It should be understood that the present disclosure is for the purpose of illustration only and that this invention includes all modifications and equivalents which fall within the scope of the appended claims.

I claim:
1. For heating air in a space, apparatus comprising a heater, a casing for the heater, the casing having a passageway for the air, the passageway having an inlet and an outlet communicating with said space, the heater being disposed in heat-transfer relation to the passageway between the inlet and outlet, a controller for varying the heat produced by the heater having an actuator, and two thermal sensors for actuating the controller, one sensor being in direct heat-transfer relation with the heater and the other sensor being responsive to the air to be heated, each sensor acting on the actuator along approximately the same line, and each sensor causing the controller to reduce said heat in response to increase of temperature.

2. Apparatus according to claim 1 wherein said controller comprises an electric switch which is normally closed to activate the heater, the sensors opening the switch to deactivate the heater in response to increase of temperature, thereby to prevent overheating of the air in said space or overheating of the heater.

References Cited

UNITED STATES PATENTS

| 2,584,445 | 2/1952 | Hajek | 236—37 |
| 2,849,185 | 8/1958 | Keyes | 200—140 X |
| 2,988,626 | 6/1961 | Buttner | 219—367 |
| 3,107,843 | 10/1963 | Finn | 200—14 X |
| 3,111,573 | 11/1963 | Crowe et al. | 219—363 |

BERNARD A. GILHEANY, Primary Examiner.
H. A. LEWITTER, Assistant Examiner.